(12) United States Patent
Ma

(10) Patent No.: US 10,576,778 B2
(45) Date of Patent: Mar. 3, 2020

(54) METHOD FOR PROCESSING INK, STONE AND OIL PAINTING

(71) Applicant: Desong Ma, Sichuan (CN)

(72) Inventor: Desong Ma, Sichuan (CN)

( * ) Notice: Subject to any disclaimer, the term of this patent is extended or adjusted under 35 U.S.C. 154(b) by 294 days.

(21) Appl. No.: 15/315,854

(22) PCT Filed: Jun. 23, 2015

(86) PCT No.: PCT/CN2015/000434
§ 371 (c)(1),
(2) Date: Mar. 19, 2017

(87) PCT Pub. No.: WO2016/115649
PCT Pub. Date: Jul. 28, 2016

(65) Prior Publication Data
US 2017/0190210 A1    Jul. 6, 2017

(30) Foreign Application Priority Data

Jan. 21, 2015   (CN) .......................... 2015 1 0028647

(51) Int. Cl.
*B44C 3/02*   (2006.01)
*B44C 3/06*   (2006.01)
(Continued)

(52) U.S. Cl.
CPC .................. *B44C 3/06* (2013.01); *B44D 2/00* (2013.01); *B29C 65/48* (2013.01); *B29C 65/562* (2013.01);
(Continued)

(58) Field of Classification Search
USPC ..... 156/58, 59, 60, 61, 62, 62.2, 63, 91, 92, 156/93, 94, 98, 153, 154, 196, 242, 245,
(Continued)

(56) References Cited

U.S. PATENT DOCUMENTS

| 3,680,225 A * | 8/1972 | Ishida ...................... B44C 1/00 |
| | | 434/84 |
| 3,744,152 A * | 7/1973 | Crasilneck ............. G09B 19/10 |
| | | 434/84 |
| 3,897,645 A * | 8/1975 | Scheyer .................. B44C 3/025 |
| | | 40/800 |
| 2001/0048974 A1 | 6/2001 | Cai |

FOREIGN PATENT DOCUMENTS

CN         1081640           2/1994
CN         1081640 A  *    2/1994
(Continued)

*Primary Examiner* — Philip C Tucker
*Assistant Examiner* — Brian R Slawski
(74) *Attorney, Agent, or Firm* — Bay State IP, LLC

(57) ABSTRACT

Disclosed is a method for processing an ink, stone and oil painting, comprising the steps of: mounting a Chinese painting painted on a piece of Chinese art paper by hand on the base plate; determining a replacement part on the surface of the painting, and determining a sculptural material according to the contents of the painting in the replacement part, and processing a sculptural module; placing the sculptural module on the replacement part and fixing same to the base plate; and further processing the sculptural module and connecting same to the surface of the painting. Drawing by using techniques of oil painting and sculpture/Chinese painting makes the contents of the painting coordinate with the contents of a viewing surface of the sculptural module.

5 Claims, 1 Drawing Sheet

(51) Int. Cl.
  *B44C 5/06* (2006.01)
  *B44F 9/00* (2006.01)
  *B32B 7/08* (2019.01)
  *B29C 65/48* (2006.01)
  *B29C 65/56* (2006.01)
  *B29C 65/72* (2006.01)
  *B44D 2/00* (2006.01)

(52) U.S. Cl.
  CPC .................. *B29C 65/72* (2013.01); *B32B 7/08* (2013.01); *B44C 3/025* (2013.01); *B44C 5/06* (2013.01); *B44F 9/00* (2013.01)

(58) Field of Classification Search
  USPC .......... 156/277, 278, 280, 297, 299; 40/615; 427/258
  See application file for complete search history.

(56) References Cited

FOREIGN PATENT DOCUMENTS

| | | | | |
|---|---|---|---|---|
| CN | 101077675 | | 11/2007 | |
| CN | 101077675 A | * | 11/2007 | |
| CN | 201721235 | | 1/2011 | |
| CN | 202448640 | | 9/2012 | |
| CN | 202448640 U | * | 9/2012 | |
| FR | 2824781 A1 | * | 11/2002 | ............. B44C 3/025 |
| GB | 2065567 A | * | 7/1981 | ............. B44C 1/10 |
| JP | 56162612 A | * | 12/1981 | |
| JP | 02043100 A | * | 2/1990 | ............... B44F 7/00 |
| WO | 2010041322 | | 4/2010 | |
| WO | WO-2010041322 A1 | * | 4/2010 | ............. B44C 3/123 |

\* cited by examiner

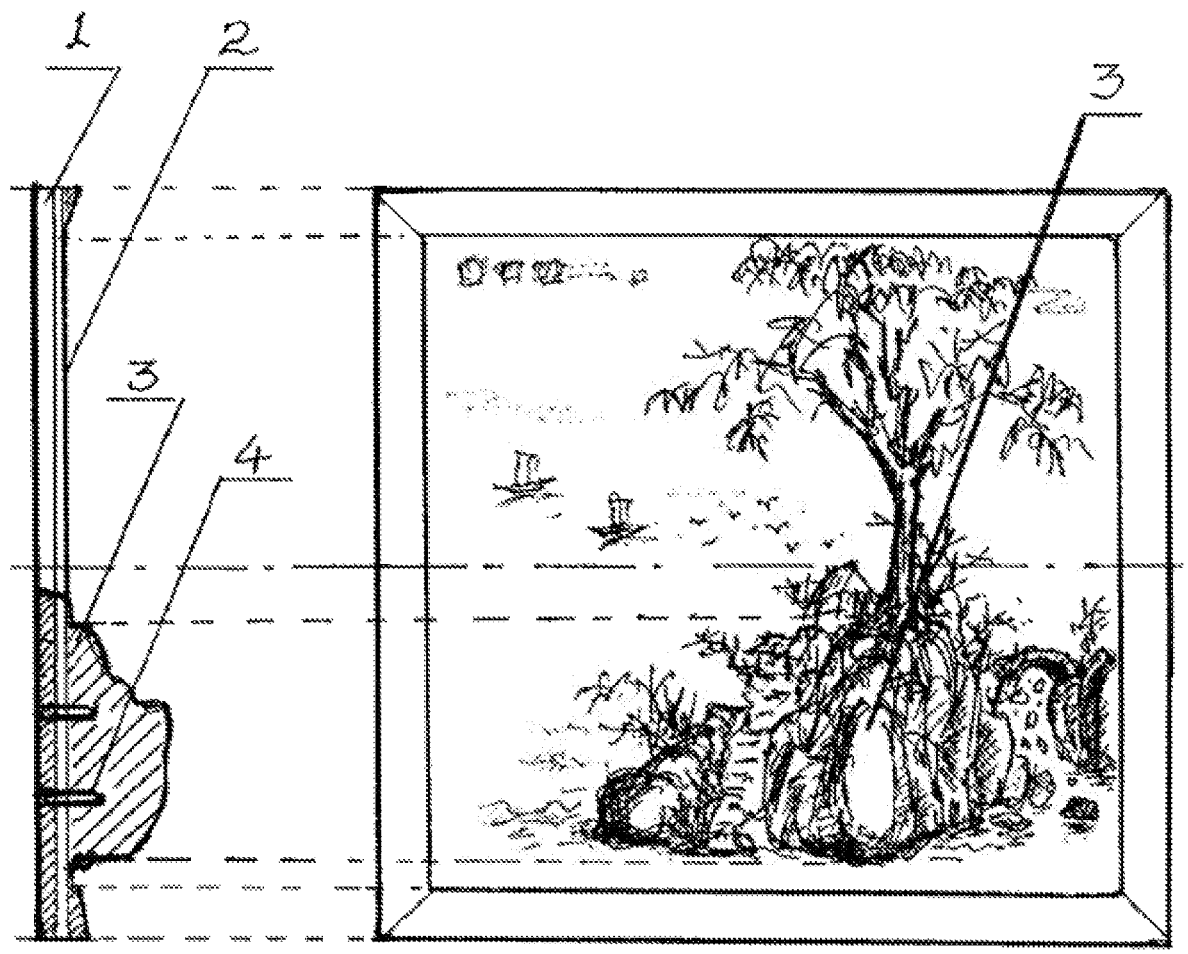

METHOD FOR PROCESSING INK, STONE AND OIL PAINTING

CROSS REFERENCE TO RELATED APPLICATION

This application is for entry into the U.S. National Phase under § 371 for International Application No. PCT/CN2015/000434 having an international filing date of Jun. 23, 2015, and from which priority is claimed under all applicable sections of Title 35 of the United States Code including, but not limited to, Sections 120, 363, and 365(c), and which in turn claims priority under 35 USC 119 to Chinese Patent Application No. 20150028647.X filed on Jan. 21, 2015.

I. TECHNICAL FIELD

The traditional brush painting, also called Chinese painting, is the national treasure and pride of Chinese people. The present invention relates to a method for fabricating a new sort of painting integrating Chinese painting, oil painting and sculpture, mainly by making use of the stereo characteristics of a stone and a solid material and the texture of the object, and by combining the techniques of Chinese painting, oil painting and sculpturing. Such a painting is temporarily called an ink, stone and oil painting or a unique ink and stone painting. Such a painting endows the traditional painting and calligraphy with various new artistic presentation forms, increases the presentation elements (i.e., stones such as shales, fossils, ores or cobblestones, and solid materials such as tree branches, wood, metals, 3D printed objects or sculpture mud) of a painting on the basis of preserving and inheriting Chinese traditional arts, and expands the painting space.

II. BACKGROUND

At present, the traditional Chinese paintings are usually painted on a piece of Chinese art paper or silken cloth with a flat surface. Since the elements presenting the painting are not rich enough, the stereo sense, texture and the sense of layering of the painting are insufficient visually. In contrast, although the oil painting may better show the stereo effects of scenes in the painting, it is required to use a method of accumulating oil paints to stereo objects, and this method is time-consuming, labor-consuming and waste of oil paints. Meanwhile, due to the material problem, the Chinese painting, the oil painting and the sculpture cannot be integrated into a same painting. For example, since the Chinese art paper and the silken cloth are too thin and insufficient in strength to bear the weight of the oil paints, and the canvas usually for oil painting cannot exhibit the artistic effects to be achieved by the penetration and rendering of ink and thus cannot support the creation of a Chinese painting. In this case, it is very difficult to exhibit the characteristics of two or even more sorts of painting in one painting. Moreover, for the Chinese painting, the characteristics of the ink and the Chinese art paper are mainly utilized, while for the oil painting, oil paints are mainly used. However, both the ink and the oil paint are monotonous and there are less painting elements, so the painting is not rich enough.

III. SUMMARY OF THE INVENTION
TECHNICAL PROBLEM TO BE SOLVED

On the surface of a Chinese painting painted by the traditional brush ink, a carefully selected stone or solid material is fixed on a proper position on the surface of the painting by the sculpturing technique; then, the object is fitted with the surface of the painting by the embossment technique so that a stereo painting is formed; drawing is performed on the stone and the solid material by the oil painting technique so that the stone and the solid material become more stereo, and the sense of reality and the texture thereof are enhanced so that they are fused into the painting. By such processing, the whole painting may have the artistic conception of the Chinese painting, exhibit the characteristics such as reality of the oil painting and also have the stereo effects of the sculpture.

Technical Solutions

1. Fabrication of a Painting

A painting is painted to produce a finished Chinese painting or material prepared for subsequent procedures.

2. Selection and Processing of a Base Plate for Mounting

A hard object is selected as the base plate. The hard object needs to be non-deformable. Here, the hard object may be a piece of wood, a fiberboard, a moisture-proof plate, a bamboo product, plastics, a composite material, a metal or a stone (that is, the base plate is required to be non-deformable after having a stone and a solid object attached thereon, and also required to promise that the object will not fall off the base plate). The surface of the base plate is flattened so that the surface is flat and free of bumps. If drilling is required in the subsequent steps, it is necessary to reserve the space for drilling. Then, the Chinese painting is mounted on the base plate.

3. Selection and Rough Processing of a Stone and a Solid Material

A stone (which may be a shale, jade, malachite, Xuan stone, chrysanthemum stone, crystal, granite, marble, agate, fossil and ore, bluestone, cobblestone, etc.) and a solid material (which may be wood, an animal or plant specimen, metal, a 3D printed object, etc.) are selected: in accordance with the design requirements of the painting, the stone and the solid material are selected in texture, shape, size, color and other features; and then the selected stone and solid material are processed roughly by decontaminating, drilling, cutting, hollowing-out, burnishing, polishing and other methods, so that the stone and the solid material may be matched with the painting and meet the basic requirements for the painting. Since the base plate is flat while the stone and the solid material are different in shape, a surface of the stone and the solid material to be mounted on the base plate needs to be cut into a flat or approximately flat surface, to be convenient for attachment and fixation in the next step.

4. Fixation of the Stone and the Solid Material on the Base Plate

The stone and the solid material are fixed on the painting at proper positions by glue (this glue is selected depending on the properties of the object, and different glues are used for different objects; for example, epoxy resin glues such as marble glue may be used for the stone, while a latex glue may be used for the light-weight wood). Part of the stone and the solid material which cannot be fixed by glue is required to be additionally reinforced by drilling and in conjunction with iron nails, pegs, etc.

5. Fine Processing of the Stone and the Solid Material

The stone and the solid material fixed on the Chinese painting are carefully carved by the sculpturing technique so that the stone and the solid material are more stereo and layered. In accordance with the requirements of the surface of the painting, positions where the natural textures of the stone and the solid material are to be exhibited are exposed, thereby conforming to the layout of the whole painting.

6. Connecting the Stone and the Solid Material to the Chinese Painting

After the processed stone and solid material are fixed on the surface of the painting at proper positions, at the connection between the both, by the sculpturing technique, the stone and the solid material are connected to the surface of the painting by a material which is moldable during manufacturing and has a fixed shape after dried, such as sculpture mud, epoxy resin or others (the sculpture mud may be cracked after being dried, so it is required to supplement mud for multiple times to realize seamlessness. For example, if it is expected to show that a water flow in the painting spills over a certain part of the real stone placed on the surface of the painting, it is required to fill the contact part between the stone and the water with a material such as sculpture mud so that the stone and the water are connected closely. Accordingly, the reality is reserved while exhibiting stereo effects, and the stone and the water are coordinated with each other to form a unified painting.

7. Drawing by Using the Oil Painting and Chinese Painting Techniques

Drawing is performed on the stone and the solid material by using the oil painting and Chinese painting techniques, so as to make them more realistic. For example, if it is to represent an eminent peak by a stone, the texture of the mountain is drawn on the stone by the perspective drawing oil painting technique, so that the stone and the scenes in the Chinese painting are combined and coordinated with each other and well-proportioned. For another example, on the fillers such as sculpture mud additionally provided for purpose of showing that the water flow in the Chinese painting spills over a certain part of the real stone placed on the painting in the above Item 6, drawing is performed with oil paints by the oil painting technique, so that the water flow and the stone are connected smoothly and a unified painting is finally formed.

8. Final Processing of the Painting

Since the Chinese painting has been mounted and thus protected to a certain extent, for the part drawn by the oil painting technique, a layer of "gloss oil" special for the oil painting is uniformly coated on the surface after the paints on the surface of the painting are completely dried. The gloss oil plays a role of protecting the paints of the painting, and makes the painting brighter and better in texture. Finally, the painting is framed and equipped with a hanging peg. Meanwhile, with the development of the science and technology, a better material (if any) for protecting the painting may also be used.

Beneficial Effects

Among various cultures in the world, Chinese painting is, as a special cultural symbol which is representative of the Chinese culture, the pride of Chinese people and the treasure in the cultures in the world. The Chinese painting strives for "spirit and vitality", beyond the similarity of object appearance. Instead, the Chinese painting focuses on the presentation of the subjective interest of an author, and is a "presentation" art for expressing "spirit" and "realm". In the history of western painting, the oil painting is dominant as a "reproduction" art which can fully show the drawn subject and has rich colors and strong stereo sense. However, in the traditional painting field, there is no painting integrating the two sorts of painting into one.

With regard to the new sort of painting provided by the present invention, on the basis of the Chinese painting and in combination of the respective characteristics of the stone and the solid material, patterns are drawn on the surface of the stone and the solid material by the oil painting technique so that the stone and the solid material act as mountains, cliffs, roads, bridges, trees or other scenes in the painting. Accordingly, both the artistic conception of the Chinese painting and the sense of aesthetics of the oil painting are realized. The stones and various solid materials placed on the painting make the sense of layering, the stereo sense and the sense of reality of the painting more distinct. Moreover, since the stones differ in size, shape and texture and the solid materials are distinctive, each painting integrating these different stones and solid materials has characteristics distinguishing from other paintings of the same type and is thus unique. The new sort painting provided by the present invention overcomes the shortcoming of non-rich drawing elements in the traditional sort of painting, and provides an infinite selection space for painters and painting workers in terms of elements presenting the painting in the exploitation field of Chinese painting.

With regard to this sort of painting due to the wide selection range of stones and solid materials, there are a large variety of objects suitable for the painting. Accordingly, the painting not only has its own artistic value but also has great collectable value by adding materials such as rare jades, precious wood or even rare fossils in the painting. Since the painting product is based on the Chinese painting, poems, or quotes can be written on the painting, so that the painting is endowed with the literary meaning and pedagogical meaning. Or even the painting can be provided with a short story for increasing the narrativity, storytelling and ideological content. Meanwhile, since the natural textures of real rare stones, wood or other materials are added in some parts of the painting, the ornamental value of the painting is increased.

The present invention provides a method for processing an ink, stone and oil painting. In the painting processed by the present invention, natural stones and solid objects are adhered to the surface of the painting on the basis of fully embodying the traditional Chinese painting. Wherein, the objects may be jades, agates, shales, sands, cobblestones, fossils of plants, granites, marbles, various ores, metals, plastics, 3D printed solid objects, ebony, bamboos, trees or other objects. A moldable material is filled and sculptured between the adhered objects and the surface of the painting. The moldable material is solid after dried, so that the painting is more coordinative and perfect. In addition that this sort of painting completely inherits the characteristics of ink, color and rendering techniques specific to the Chinese painting, the adhered objects are drawn and processed by the perspective and coloring techniques of the oil painting, so that the same painting has the characteristics of the above two sorts of painting. That is, in one painting, both the artistic conception of the Chinese painting and the perspective sense and coloring of the oil painting are realized, and both the stereo sense and the sense of layering of the sculpture and the texture of the natural objects are exhibited. Hence, it is a new sort of painting integrating a plurality of painting characteristics.

This sort of painting has a very wide selection range of objects (stones and solid objects) to be added, so it provides an infinite selection space for painters and painting workers in terms of selection of drawing elements in the painting field.

Since precious stones, millennium fossils, metal ores, valuable wood or other others can be selected and added in the painting, the collectable value and the ornamental value of the painting are increased. Since this sort of painting integrates the characteristics of the Chinese painting, the oil painting, the sculpture and the natural sense and texture of the added objects, the painting has prominent novelty and innovativeness.

For example, if a painting is made by the Chinese ink painting technique, for a distant mountain part, the shale may be used as the distant mountain in order to better show the beauty of the distant mountain at sunset. The natural texture and the sense of layering of the shale make the painting more vivid and stereo. The path to a temple in the painting is replaced with cobblestones. By drawing by the oil painting technique, the distant mountain and the path have a more tactile sense and an enough sense of reality, like a real mountain and a real stone path.

This sort of painting provides new visual aesthetics for people.

IV. Brief Description of the Drawings

FIG. 1 illustrates a Chinese painting mounted on a base plate.

V. DETAILED DESCRIPTION OF THE PREFERRED EMBODIMENTS

1. A Chinese painting is painted on a piece of Chinese art paper and then mounted on a base plate.

In principle, the base plate used in the new sort of painting provided by the present invention is a hard object which will not be deformed for a long period of time. The base plate may be a bamboo fiberboard, a wood fiberboard, a plastic plate, a metal plate, a carpentry board, an aluminum honeycomb board or made of other materials, in order to support the solid objects. Meanwhile, the flatness of the surface is also taken into consideration.

2. A replacement part on the surface of the painting is determined according to the contents of the Chinese painting, and a sculptural material is determined according to the contents of the painting in the replacement part. That is, proper stones and/or solid materials are selected.

The stones may be unique stones such as shales, bluestones, stalactites; or various fossils, marbles, granites; or various metals such as gold, silver, copper or iron. The stones may also be metal ores, crystals, agates, jades, shells or others. In accordance with the painting requirements, stones of different sizes, shapes, colors and textures are selected. Where the artistic conception of the painting is to be expressed while expressed insufficiently by painting, proper stones are deployed, so that many new elements may be increased to the way of presenting the painting.

The solid material may be a tree branch, a bamboo branch, a plastic object, a metal object, a ceramic object, a glass object, or even precious Gold phoebe, ebony, etc. Any solid material capable of coordinating with painting and expressing the requirements to be achieved by the painting may be used in the painting.

1. The sculptural material is processed into a sculptural module, one surface of which is a fixing surface fixedly connected to the base plate, the fixing surface having an edge consistent with a profile of the replacement part, while the other surface of which is a viewing surface in which the sculptural contents are similar to the contents of the painting in the replacement part.

2. The sculptural module is placed in the replacement part and fixed to the base plate by punching, pinning, gluing or other methods, with the edge of the fixing surface being superposed with profile of the replacement part.

When the stone and/or the solid material is adhered to the surface of the painting, different glue types are selected mainly depending on the properties of the stone and the solid material. Epoxy resin glues such as marble glue, latex glue, oxhide gelatin, etc., may be used for the stone, while a latex glue or paste may be used for the light-weight wood. For solid materials such as a large stone, to ensure the stability, the corresponding base plate of the stone and the solid material closely adhered to the painting is punched on both surfaces. As appropriate, metal screws, pegs, stone pins or other materials are selected for connection. The surface of the object attached to the surface of the painting is required to be processed into a flat plane similar to the surface of the painting, and then adhered.

3. The sculptural module is further processed: the fixed sculptural module is carved by the sculpturing technique so that the sculptural module is more stereo and layered.

4. The sculptural module is connected to the surface of the Chinese painting: by means of sculpturing, at a connection between the sculptural module and the surface of the Chinese painting, the surface of the painting is connected to the sculptural material by using a material which is moldable during manufacturing and has a fixed shape after dried.

5. The contents of the painting are coordinated with the contents of the viewing surface of the sculptural module by drawing by the oil painting and sculpturing/Chinese painting techniques. After the preceding steps have been done, to further perfect the painting as a whole, fine drawing is performed on the surface by all the oil painting techniques, including color accumulation, and meanwhile, particularly at the connection between the surface of the painting and the sculpturing module, the painting is further processed by the Chinese painting and sculpturing techniques. In this way, the whole painting is unified perfectly.

6. The whole painting is protected. The Chinese painting, as the basis of the whole painting, has been mounted after fabricated, so the Chinese painting itself plays a protection role to a certain extent. However, if the part drawn by the oil painting technique is not protected, the service life of the painting will be influenced. Therefore, after the paints on the surface of the oil painting part have been completely dried, a layer of "gloss oil" special for the oil painting is uniformly coated on the surface. The gloss oil plays a role of protecting the paints on the surface of the painting, and makes the painting brighter and better in texture.

Finally, the painting is framed. Meanwhile, with the progress of the science and technology, a better protective material (if any), for example, a protective layer made of a nano-material, may also be used.

What is claimed is:

1. A method for processing an ink, stone and oil painting, comprising the steps of:
   (1) mounting a Chinese painting painted on a piece of Chinese art paper by hand on a base plate;
   (2) determining a replacement part on a surface of the painting according to contents of the painting, and determining a sculptural material according to the contents of the painting in the replacement part;
   (3) processing the sculptural material into a sculptural module, one surface of which is a fixing surface fixedly connected to the base plate, the fixing surface having an edge consistent with a profile of the replacement part, while an other surface of which is a viewing surface in which a sculptural contents are similar to the contents of the painting in the replacement part in that the sculptural contents have solid materials which correspond to the painting in the replacement part;

(4) placing the sculptural module in the replacement part and fixing the sculptural module to the base plate by punching, pinning, or gluing, with the edge of the fixing surface being superposed with the profile of the replacement part;

(5) further processing the sculptural module: carving the fixed sculptural module by a sculpturing technique so that the sculptural module is more stereo than the sculptural module had been before applying the sculpturing technique and layered;

(6) connecting the sculptural module to the surface of the Chinese painting: by means of sculpturing, at a connection between the sculptural module and the surface of the Chinese painting, connecting the surface of the painting to the sculptural material by using a material which is moldable during manufacturing and has a fixed shape after being dried; and (7) coordinating the contents of the painting with the contents of the viewing surface of the sculptural module by drawing by an oil painting technique and further processing the painting by the sculpturing technique and a Chinese painting technique.

2. The method for processing an ink, stone and oil painting according to claim 1, characterized in that a finished product manufactured by this method is a presentation art integrating the Chinese painting painted on a piece of Chinese art paper by hand, a Western oil painting painted by hand and a sculpture art.

3. The method for processing an ink, stone and oil painting according to claim 1, characterized in that the sculptural material is a painting element selected from: a stone, an ore, a piece of wood, an animal or plant fossil or a 3D printed object.

4. The method for processing an ink, stone and oil painting according to claim 1, characterized in that a similarity of a sculptural shape of the viewing surface to the contents of the painting in the replacement part means that the sculptural shape of the viewing surface is a stereo reproduction of the contents of the painting in the replacement part.

5. The method for processing an ink, stone and oil painting according to claim 1, characterized in that, after a pigment of the painting is dried, a layer of gloss oil for the oil painting is uniformly coated on a surface of a part painted by the oil painting technique wherein the gloss oil is designed to play a role in protecting an oil paint on the surface of the painting and enhancing a brightness and texture of the painting.

\* \* \* \* \*